United States Patent
Sugiyama et al.

(10) Patent No.: US 7,310,166 B2
(45) Date of Patent: Dec. 18, 2007

(54) INFORMATION PROCESSING APPARATUS AND METHOD, AND PRINT CONTROL PROGRAM

(75) Inventors: Kouichi Sugiyama, Tokyo (JP); Hiroshi Ozaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 982 days.

(21) Appl. No.: 10/626,531

(22) Filed: Jul. 25, 2003

(65) Prior Publication Data
US 2004/0184052 A1    Sep. 23, 2004

(30) Foreign Application Priority Data
Jul. 26, 2002  (JP)  ............ 2002-218576

(51) Int. Cl.
G06K 15/02  (2006.01)
H04N 1/387  (2006.01)

(52) U.S. Cl. .......... 358/1.9; 358/1.13; 358/1.18; 715/517; 715/523

(58) Field of Classification Search ........ 358/1.9, 358/3.24, 1.18, 448, 1.13; 382/276, 293, 382/295; 715/517, 523
See application file for complete search history.

(56) References Cited

U.S. PATENT DOCUMENTS 6,236,815 B1  5/2001  Kaneko et al. .......... 399/45

FOREIGN PATENT DOCUMENTS

| JP | 05-012388 | 1/1993 |
|---|---|---|
| JP | 05-022570 | 1/1993 |
| JP | 06-278315 | 10/1994 |
| JP | 9-309243 | 12/1997 |
| JP | 10-329311 | 12/1998 |
| JP | 11-243486 | 9/1999 |
| JP | 2002-036631 | 2/2002 |

*Primary Examiner*—Scott A. Rogers
(74) *Attorney, Agent, or Firm*—Fitzpatrick, Cella, Harper & Scinto

(57) ABSTRACT

An information processing apparatus, in which a printer driver is installed for transmitting a print job to be printed to a printer, includes a display for displaying a printer setting window activated by the printer driver, a print medium designator for designating a print medium from the printer setting window, a mirror image print designator for designating a mirror image print via the printer setting window on which it can be designated whether the mirror image print is performed or not when a transparent medium has been designated by the print medium designation means, and a print job command setter for setting a paper type designation command. The print job command setter (i) sets a transparent medium designation command in a PDL command of the print job when a transparent medium is designated by the print medium designator and the mirror image print is not selected by the mirror image designation means, and (ii) sets the transparent medium designation command and the mirror image print designation command in the PDL command of the print job when a transparent medium is designated by the print medium designator and the mirror image print is selected by the mirror image designator.

6 Claims, 10 Drawing Sheets

SETUP OF PRINT METHOD
    COLOR/MONOCHROME
    RESOLUTION, GRADATION
    PAGE LAYOUT
    MIRROR IMAGE PRINT = ON
    etc.

SETUP OF PAPER FEED/DISCHARGE METHOD
    DESIGNATION OF PAPER FEED PORT
    DESIGNATION OF PAPER SIZE
    DESIGNATION OF PAPER TYPE = OHP FILM
    etc.

SETUP OF FINISHING METHOD
    DESIGNATION OF PAPER DISCHARGE PORT
    FINISHING
    etc.

ACTUAL PRINT DATA

INFORMATION PROCESSING APPARATUS AND METHOD, AND PRINT CONTROL PROGRAM

FIELD OF THE INVENTION

The present invention relates to an information processing apparatus and method, and a program for implementing the method and, more particularly, to an information processing apparatus as a host computer for transmitting a print job to be printed by a printer, an information processing method, and a print control program.

BACKGROUND OF THE INVENTION

As recent multifunctional printers, those with a mirror image flip print function, and those with a connection function to a network are available. For this reason, a network system often includes printers with a mirror image flip print function, and those without any mirror image flip print function together.

As a conventional print technique, an OHP (Over Head Projector) print technique that prints on a transparent plastic film in consideration of use in an OHP is available. In the OHP print technique, color agents such as inks, toners, or the like are applied to one surface of a plastic film and are fixed by drying or welding them, thus fixing an image in the same manner as in a print process on paper.

However, a plastic film on which an image is printed using this technique curves, i.e., curls in the print surface direction. Normally, an OHP film is set on a document table of an OHP apparatus with its print surface facing up, and light is projected from below or above the OHP film, thus projecting light transmitted through the OHP film onto a screen.

However, when a curled OHP film is actually used in the OHP apparatus, the edge portions of the film rise, and the central and edge portions of the film cannot be simultaneously focused, thus blurring the projected image.

SUMMARY OF THE INVENTION

It is an object of the present invention to provide an information processing apparatus and method, which can suppress a film from rising by reversing the curl direction of the film using a mirror image print function.

It is another object of the present invention to provide an information processing apparatus and method, which can improve the operability by reducing user's labor without troubling the user, i.e., by automatically executing a mirror image print process when an OHP film is selected as an output medium, and can output a high-quality OHP film.

It is still another object of the present invention to provide an information processing apparatus and method, which can improve the operability by reducing user's labor without troubling the user, i.e., by switching a mirror image print process in an information processing apparatus depending on whether or not a printer as an output destination has a mirror image flip print function, and can output a high-quality OHP film.

In order to solve the aforementioned problems, the present invention has the following arrangement.

An information processing apparatus for transmitting a print job to be printed by a printer having a function of executing a mirror image flip print process in response to mirror image designation, comprises: a checking unit for checking a designated print medium; a designation unit for, when the checking unit determines that the designated print medium is a transparent medium, appending mirror image designation information to rendering contents to be printed; and an output unit for generating a print job on the basis of the rendering contents to be printed and the mirror image designation information, and outputting the print job to be transmitted to the printer.

Alternatively, the present invention has the following arrangement.

An information processing apparatus for transmitting a print job to be printed by a printer, comprises: a checking unit for checking a designated print medium; a conversion unit for, when the checking unit determines that the designated print medium is a transparent medium, converting rendering contents to be printed into rendering contents of a mirror image; and an output unit for generating a print job on the basis of the rendering contents of the mirror image, and outputting the print job to be transmitted to the printer.

Preferably, the apparatus further comprises a designation unit for making a user designate whether or not a mirror image flip print process is to be executed when a print medium is a transparent medium, and wherein when the designation unit designates that the mirror image flip print process is to be executed when a print medium is a transparent medium, the checking unit checks a print medium.

Preferably, the apparatus further comprises: an acquisition unit for acquiring device information of the printer; and a determination unit for determining based on the acquired device information of the printer if the printer has a mirror image flip print function, and wherein when the checking unit determines that the print medium is a transparent medium, and the determination unit determines that the printer has the mirror image flip print function, the designation unit appends the mirror image designation information to the rendering contents to be printed.

Preferably, the apparatus further comprises: an acquisition unit for acquiring device information of the printer; and a determination unit for determining based on the acquired device information of the printer if the printer has a mirror image flip print function, and wherein when the checking unit determines that the print medium is a transparent medium, and the determination unit determines that the printer does not have the mirror image flip print function, the conversion unit converts the rendering contents to be printed into the rendering contents of the mirror image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

An embodiment suited to apply the present invention will be described below.

The arrangement of a system which includes a printer to which the present invention can be applied, and an information processing apparatus such as a personal computer or the like connected to the printer will be described first.

Figure 1:
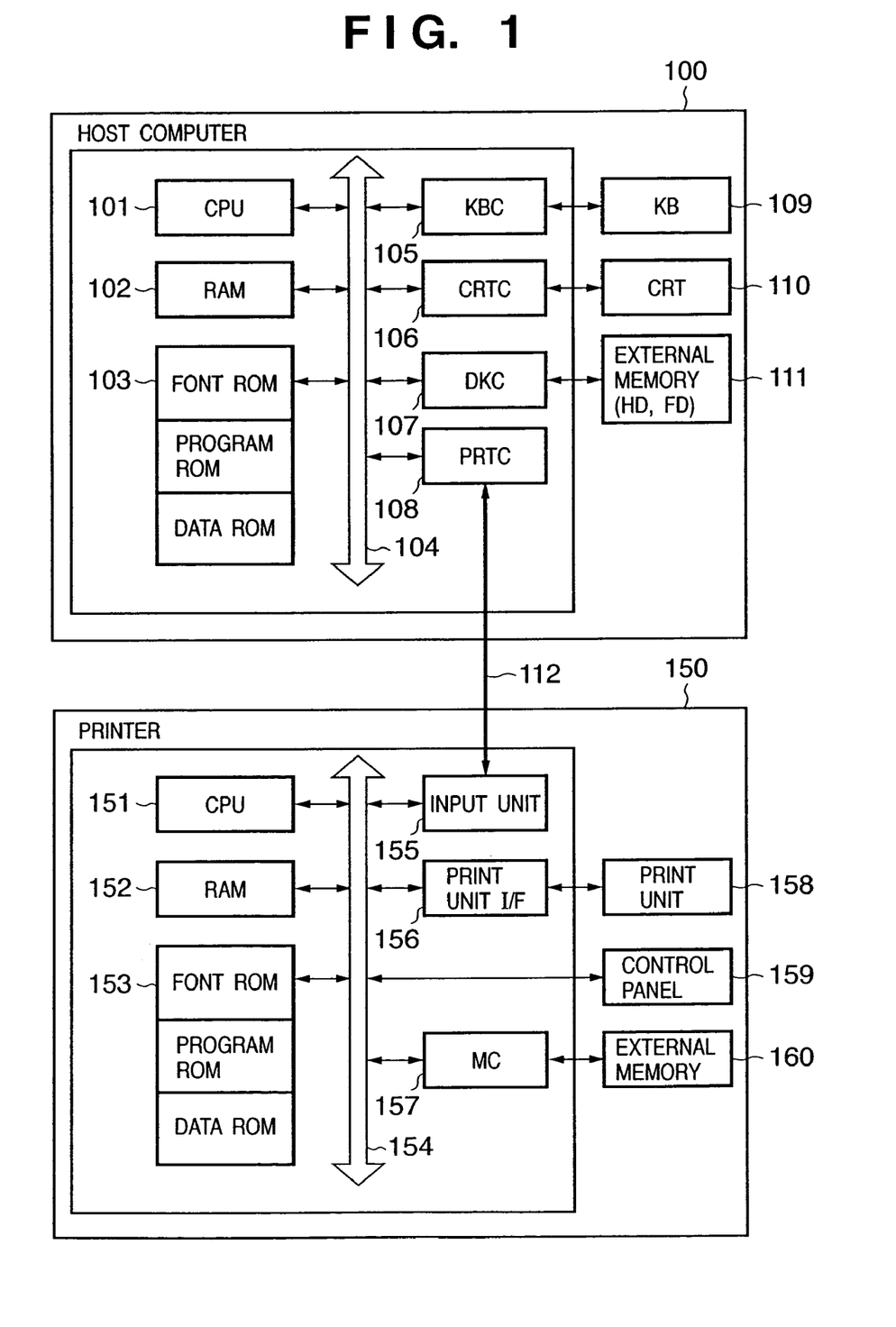
FIG. 1 is a block diagram for explaining the arrangement of an information processing apparatus and printing apparatus according to an embodiment of the present invention.

FIG. 1 is a block diagram showing the arrangement of a printer control system according to an embodiment of the present invention. Note that the present invention can be applied to any of a standalone apparatus, a system consisting of a plurality of apparatuses, and a system in which apparatuses are connected via a network such as a LAN, WAN, or the like to execute processes, as long as the functions of the present invention can be implemented.

Referring to FIG. 1, a host computer 100 comprises a CPU 101 which executes a document process including graphic data, image data, text data, and table data (including spreadsheet data or the like) together on the basis of a document processing program stored in a program ROM of a ROM 103 or an external memory 111. The CPU 101 systematically controls devices connected to a system bus 104. The program ROM of the ROM 103 or the external memory 111 stores an operating system program (to be referred to as an OS hereinafter) and the like. A font ROM of the ROM 103 or the external memory 111 stores font data and the like used in the document process. A data ROM of the ROM 103 or the external memory 111 stores various data used upon executing the document process and the like. A RAM 102 serves as a main memory, work area, and the like of the CPU 101.

A keyboard controller (KBC) 105 controls key inputs from a keyboard 109 and a pointing device (not shown). A CRT controller (CRTC) 106 controls display on a CRT display (CRT) 110. A disk controller (DKC) 107 controls access to the external memory 111 such as a hard disk (HD), floppy® disk (FD), and the like. The external memory 111 such as a hard disk (HD), floppy® disk (FD), and the like stores a boot program, various applications, font data, user files, edit files, a printer control command generation program (to be referred to as a printer driver hereinafter), and the like. A printer controller (PRTC) 108 is connected to a printer 150 via a two-way interface (interface) 112, and executes a communication control process with the printer 150.

Note that the CPU 101 executes an outline font rasterize process onto a display information RAM assured on, e.g., the RAM 102, thus allowing WYSIWYG on the CRT 110. Also, the CPU 101 opens various registered windows on the basis of commands designated by a mouse cursor (not shown) or the like on the CRT 110, and executes various data processes. Upon executing a print process, the user opens a window that pertains to print setups, and can make setups of a print process method for the printer driver, which includes printer setups and print mode selection.

The printer 150 is controlled by a CPU 151. The printer CPU 151 outputs an image signal as output information to a print unit (printer engine) 156 connected to a system bus 154 on the basis of a control program and the like stored in a program ROM of a ROM 153 or a control program and the like stored in an external memory 160. The program ROM of the ROM 153 stores a control program and the like of the CPU 151. A font ROM of the ROM 153 stores font data and the like used upon generating the output information. A data ROM of the ROM 153 stores information and the like used on the host computer in case of a printer which does not have any external memory 160 such as a hard disk or the like.

The CPU 151 can execute a communication process with the host computer via an input unit 155, and can inform the host computer 100 of device information (including designation of functions such as a mirror image flip print function and the like) of the printer and the like as information in the printer. A RAM 152 serves as a main memory, work area, and the like of the CPU 151, and its memory size can be expanded by an option RAM connected to an expansion port (not shown). Note that the RAM 152 is used as an output information rasterize area, environment data storage area, NVRAM, and the like. A memory controller (MC) 157 controls access to the external memory 160 such as a hard disk (HD), IC card, or the like. The external memory 160 is connected as an option, and stores font data, an emulation program, form data, and the like. Reference numeral 159 denotes a control panel on which operation switches, LED indicators, and the like are arranged.

The number of external memories 160 is not limited to one, and a plurality of external memories 160 may be connected. That is, option cards and external memories that store programs used to interpret printer control languages of different language systems in addition to internal font data may be connected. Furthermore, an NVRAM (not shown) may be connected, and may store printer mode setup information from the control panel 159.

Figure 2:
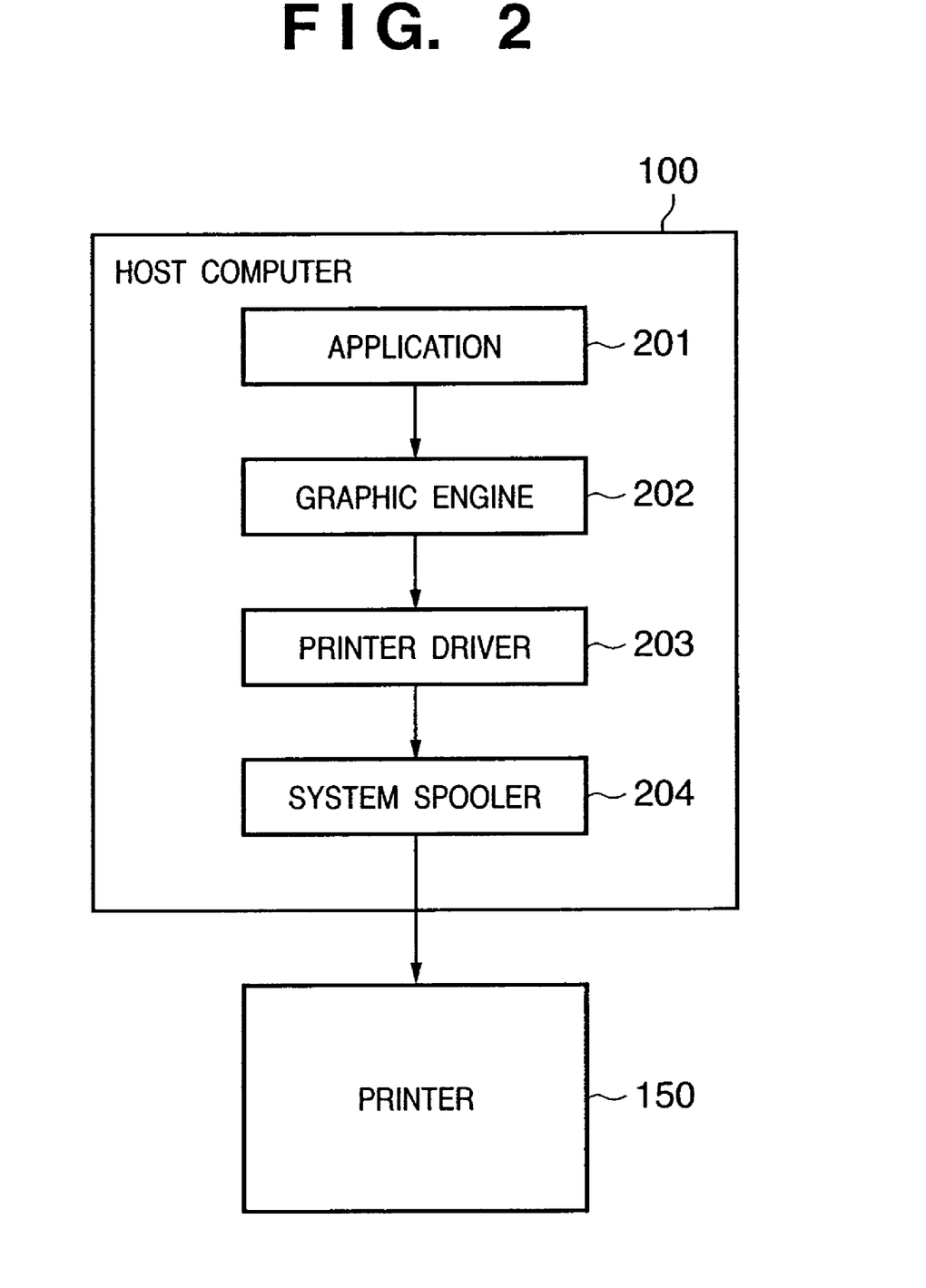
FIG. 2 is a block diagram showing the arrangement of a typical print system of a host computer to which a printer is connected.

FIG. 2 is a diagram of a typical print process in a host computer to which a printer is connected directly or via a network. An application 201, graphic engine 202, printer driver 203, and system spooler 204 are program modules, which are present as files saved in the external memory 111, and are loaded onto the RAM 102 by the OS or other modules that exploit those modules when they are executed. The application 201 and printer driver 203 can be added to the HD of the external memory 111 via the FD of the external memory 111, a CD-ROM (not shown), or a network (not shown). The application 201 saved in the external memory 111 is loaded onto the RAM 102 upon execution. When this application 201 issues a print command to the printer 150, an output (rendering) process is executed using the graphic engine 202 which is similarly loaded onto the RAM 102 and is ready to execute.

The graphic engine 202 loads the printer driver 203 prepared for each printing apparatus from the external memory 111 onto the RAM 102, and sets an output from the application 201 in the printer driver 203. The graphic engine 202 converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command that the printer can interpret, e.g., PDL (Page Description Language) data. The converted printer control command is output as print data to the printer 150 via the system spooler 204 loaded onto the RAM 102 by the OS and the interface 112.

Upon receiving the print data, the printer 150 forms an image on a medium such as a paper sheet or the like on the basis of instructions of the print data. Assume that the printer driver 203 of the present invention can designate a plastic film for OHP (to be referred to as an OHP film hereinafter) as a medium to be printed, and the printer 150 can feed an OHP film as a medium to be printed and print on that film on the basis of the designation.

Upon printing on an OHP film using the print system shown in FIGS. 1 and 2, a "curl" phenomenon often occurs. This phenomenon occurs when a plastic film deforms due to heat generated by a fixing device, and curves (curls) toward the print surface side. This phenomenon is inevitable since it is caused by a mechanical structure. However, this curl poses the following problems.

Figure 3A:
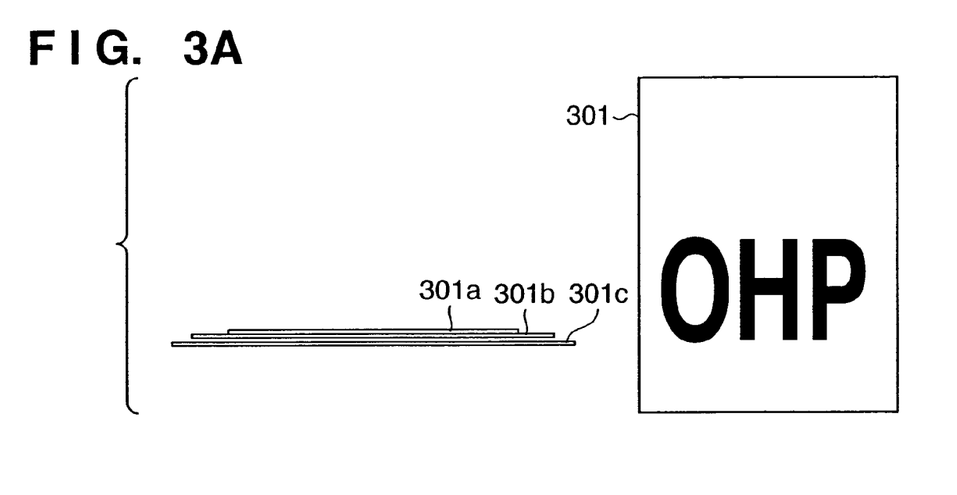
FIGS. 3A to 3C are views showing the method of placing a curled OHP film and projected images at that time.
Figure 3B:
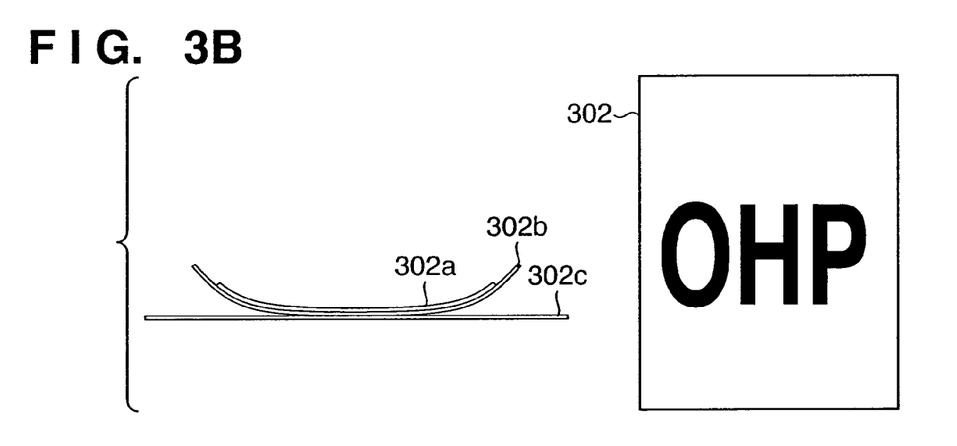

FIGS. 3A and 3B show a case wherein the OHP film printed by the aforementioned means is actually placed on a document table of an OHP. In order to project a normal image 301 in FIG. 3A using the OHP film printed by the conventional technique, an OHP film 301b must be placed on a document table 301c with its print surface 301a facing up, as shown in FIG. 3A. However, since the OHP film curls, as described above, the edge portions of an OHP film 302b rise, as shown in FIG. 3B. Hence, the edge portions of a projected image are out of focus like an image 302, resulting in a blurred image.

Figure 3C:
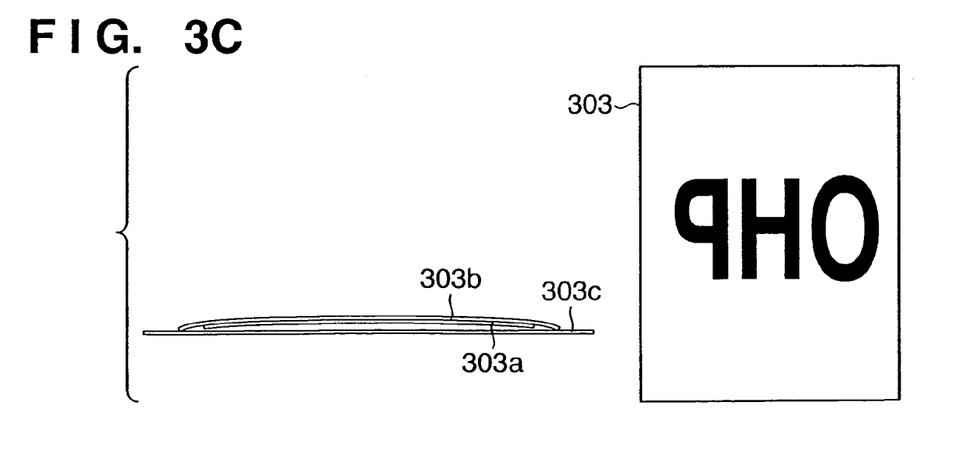

As means for avoiding the aforementioned problem, an OHP film 303b may be placed on a table 303c with its print surface 303a facing down, as shown in FIG. 3C. When the OHP film is placed in this way, since it curls downward, the film can stretch the curl by the self weight, and the rise of the film can be consequently reduced. For this reason, a sharp image can be projected like an image 303 in FIG. 3C. However, with the conventional technique, when the film is placed with its print surface facing down, an image also flips, and a projected image flips as a mirror image like the image 303.

Hence, this embodiment solves the aforementioned problem using a mirror image print function that flips and prints an image. Also, this embodiment is characterized by automatically executing the aforementioned process in accordance with a set medium without troubling the user.

An implementation method of a mirror image print process will be described below. A method of generating a mirror image includes two methods, i.e., a method of generating horizontally flipped data on the host computer 100 side before generation of PDL data, and a method of horizontally flipping data upon rasterizing a print image from PDL data on the printer 150 side without any special process on the host computer 100 side. However, the method to be used is not particularly limited. Note that this embodiment adopts the latter method.

Figure 4A:
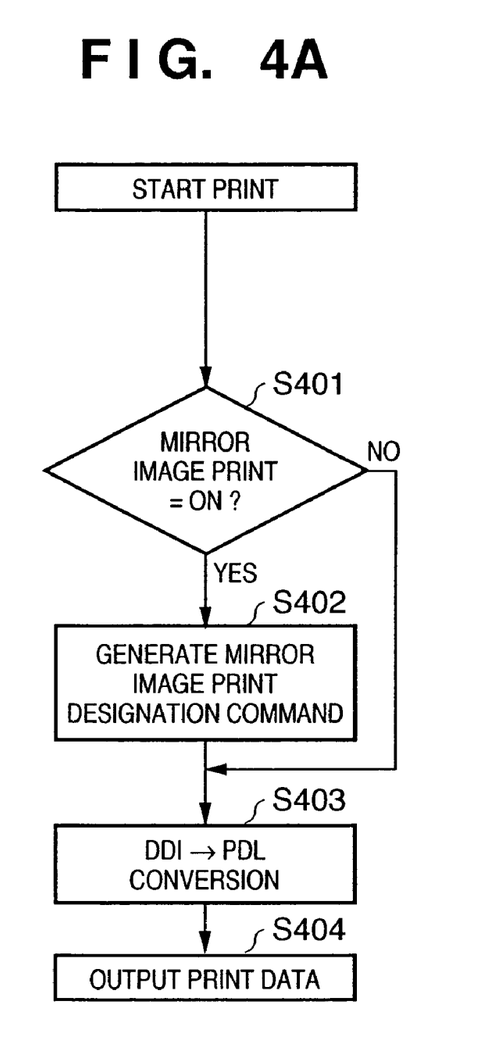
FIGS. 4A and 4B are flow charts showing an example of a mirror image print process.
Figure 4B:
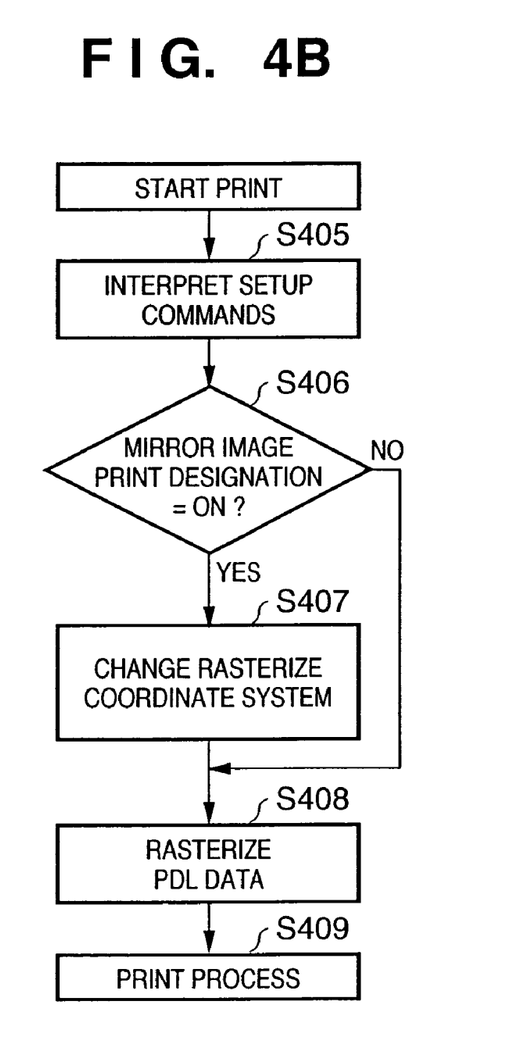

FIGS. 4A and 4B respectively show the flows of mirror image print processes in the host computer 100 and printer 150. The printer driver 203 generates commands based on respective setups made by the user before it executes an actual data process of a print command which is passed via the application 201, OS, and graphic engine 202 when the user executes a print process.

In the host computer 100, it is checked if a mirror image print mode is designated via the user interface window of the printer driver 203 (S401). That is, a flag that designates the mirror image print mode is checked to see if the mirror image mode is designated. If the mirror image mode is designated, the printer driver 203 generates a mirror image print designation command, and appends it to a print job (S402). After that, the printer driver 203 executes the same process as a normal conversion process from DDI to PDL data (S403). That is, the generated PDL data is substantially the same as that for a normal print mode, except that it includes the mirror image print designation command. The printer driver 203 transmits this data to the printer 150 via the system spooler 204 of the OS (S404).

Upon receiving this data, the printer 150 rasterizes one image on the basis of the PDL described in the data. For this purpose, commands contained in the PDL are interpreted (S405) and it is checked if the mirror image designation command is included (S406). If the mirror image designation command is included, the coordinate system on the memory space (RAM) 152 used in the rasterize process is converted to horizontally flip the origin position, i.e., to set the origin at the upper right position in place of the upper left position as its normal position, and to set the X-coordinate axis to have the left direction as a positive direction (S407). That is, the coordinate system which normally has the right direction as a positive direction is converted to have the left direction as a positive direction, and an image is rasterized on this coordinate system (S408).

If the rasterize coordinate system is not parameterized, steps S407 and S408 are inseparably executed upon rasterizing a mirror image. In such case, in step S407 the coordinate system on the memory space (RAM) 152 used in the rasterize process is converted to horizontally flip the origin position, i.e., to set the origin at the upper right position in place of the upper left position as its normal position, and to set the X-coordinate axis to have the left direction as a positive direction, and an image is then rasterized. The flow then jumps to step S409. On the other hand, in step S408 an image is rasterized as usual without converting the coordinate system.

Figure 5A:
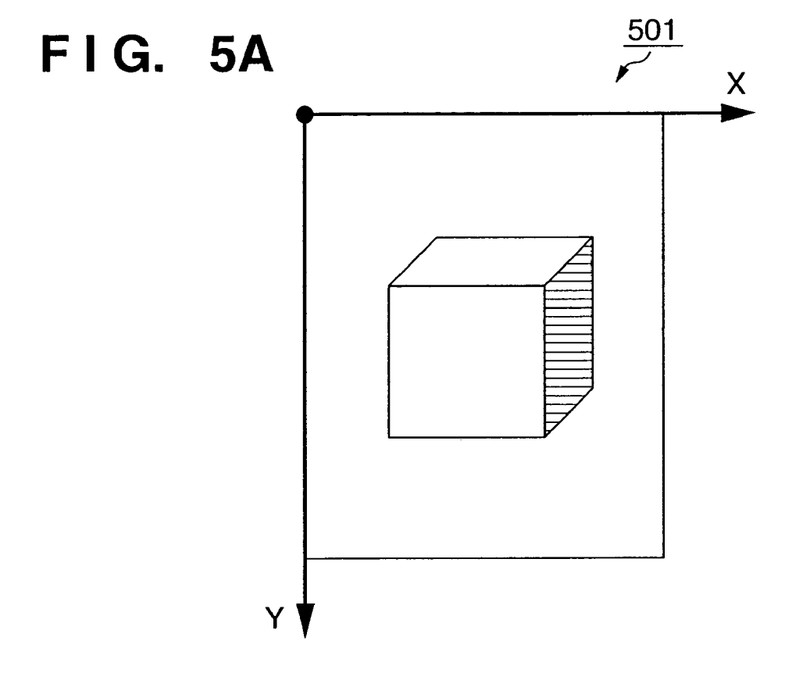
FIGS. 5A and 5B show the data rasterize coordinate systems of a printer in normal and mirror image print modes.
Figure 5B:
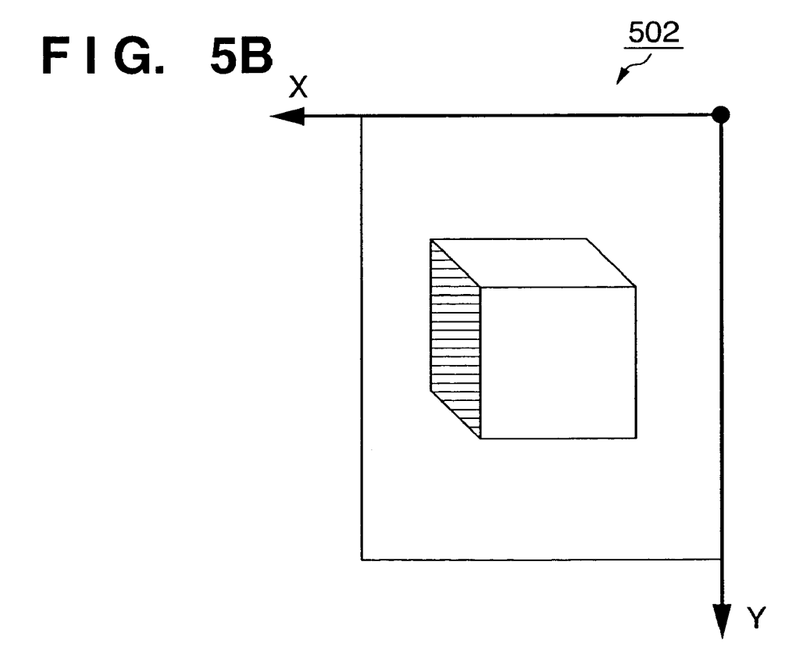

FIGS. 5A and 5B show an example in the rasterize process. An image 502 (FIG. 5B) obtained upon rasterizing data after the coordinate system is converted becomes a mirror image with respect to an original image, i.e., an image 501 (FIG. 5A) obtained upon rasterizing data on the normal coordinate system. The printer 150 prints the image rasterized in this way onto a designated medium (S409). As a result, a mirror image is generated.

Note that the mirror image designation command is generated to be included in PDL data if the mirror image mode is designated upon generating PDL data in the host computer.

With the aforementioned sequence, the mirror image print process can be realized in accordance with user's designation. For this reason, since the user explicitly designates the mirror image print mode upon printing on an OHP sheet, a mirror image is formed on the OHP sheet so that an original image can be observed from its reverse surface side. Hence, upon OHP projection, the OHP sheet is placed on the document table with its print surface facing down, and can be prevented from locally rising from the document table due to its self weight. As a result, a sharp image can be projected.

Second Embodiment

A method of automatically switching to the aforementioned mirror image print process depending on a designated medium as a characteristic feature of the present invention will be described below. The system arrangement of this embodiment is the same as that in the first embodiment shown in FIGS. 1 and 2. In this embodiment, when the user designates an OHP film as a print medium, a mirror image print process is executed based on that designation.

Figure 6A:
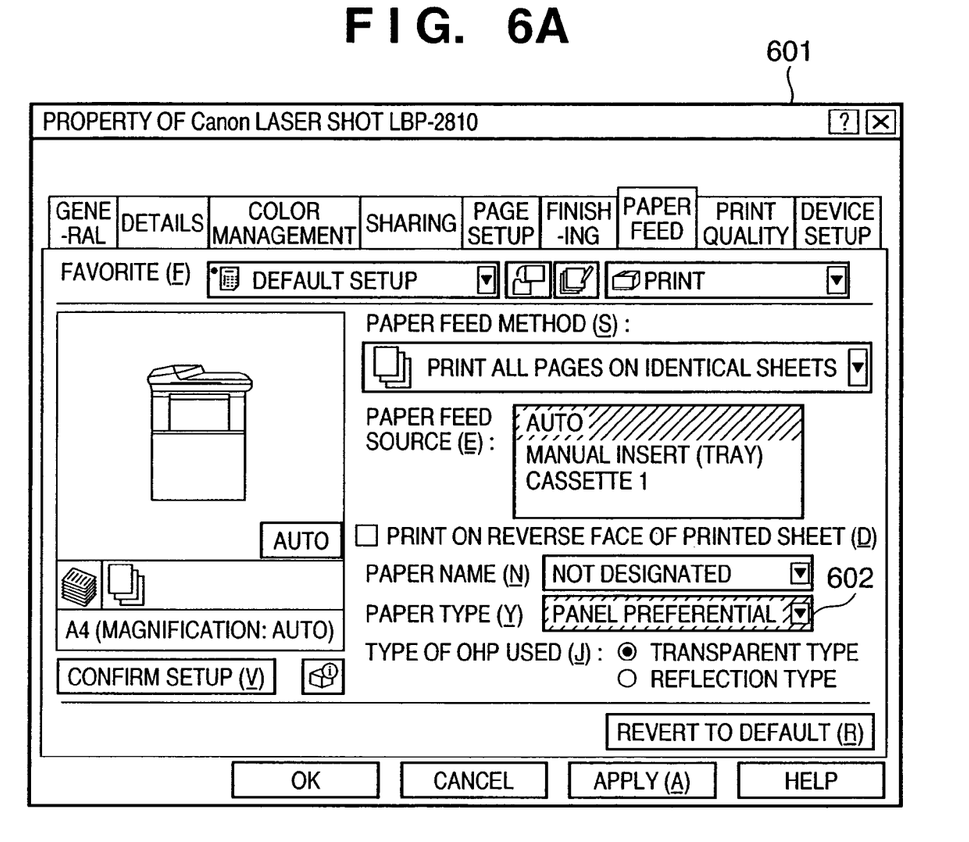
FIGS. 6A and 6B show an example of a user interface which is provided on a printer so as to make the user designate a medium.
Figure 6B:
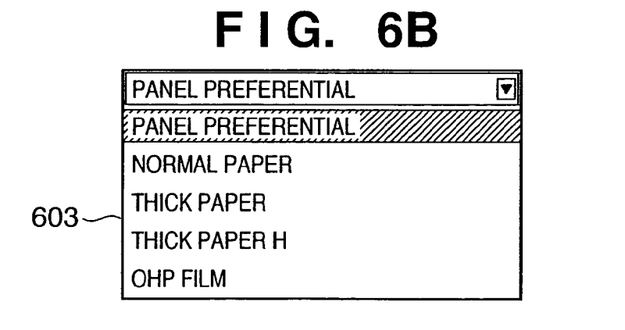

For this purpose, the printer driver 203 prompts the user to designate a medium as one of its setups before print execution. This designation allows optimal print processes corresponding to individual media. By designating a medium, control for changing the print speed to assure high fixability, or inhibiting infeasible designation for a media that cannot undergo a finishing process or two-sided print process is realized. FIG. 6A shows an example of a user interface (UI) used to designate a medium. By selecting a specific medium from a combo box 602 on a UI 601, print medium setups are changed. A combo box 603 in FIG. 6B corresponds to a menu window displayed by selecting the combo box 602. An OHP film is prepared as one of choices on this combo box 603. The type of designated medium is recorded on a predetermined area of the RAM 102 or HD 111.

Figure 7A:
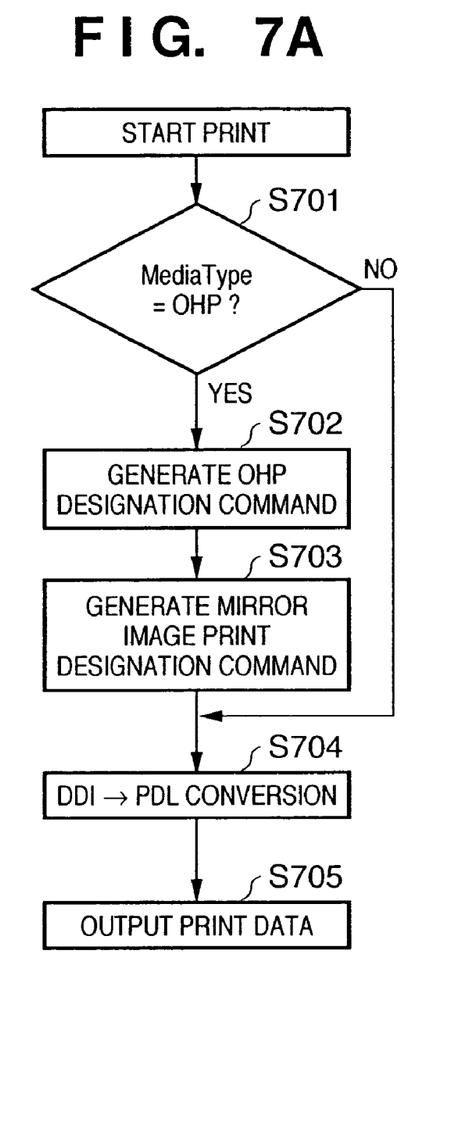
FIGS. 7A and 7B are block diagrams showing the flows of processes of the present invention.
Figure 7B:
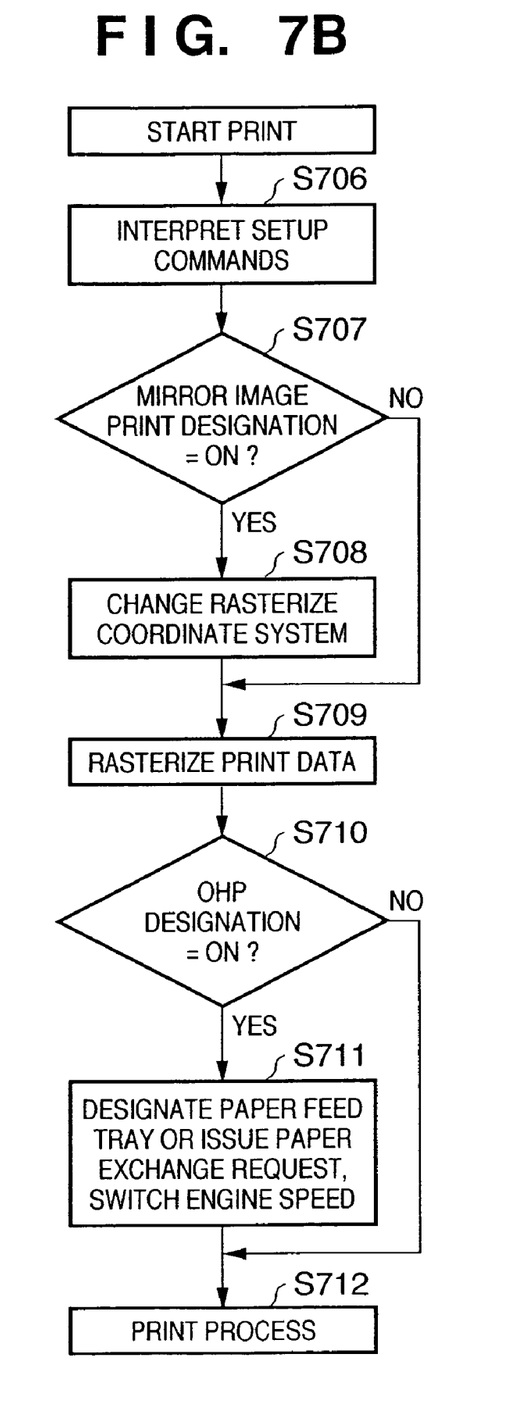

FIGS. 7A and 7B respectively show processes to be executed by the host computer and printer when an OHP film is designated as a medium.

Information indicating designation of an OHP film set on the UI 601 is temporarily held on the external memory 111. In this state, in response to a user's print start designation, the printer driver 203 begins to generate print data. The type of medium (MediaType) to be output is checked based on the setup held on the external memory 111 (S701).

If this checking result indicates "OHP film", the following process is executed. The printer driver 203 generates a command that designates that an OHP film is a medium to be printed on the basis of the medium setup (S702). Subsequently, the printer driver 203 generates a mirror image print designation command (S703). These processes are skipped when a medium other than an OHP film is designated.

Figure 8:
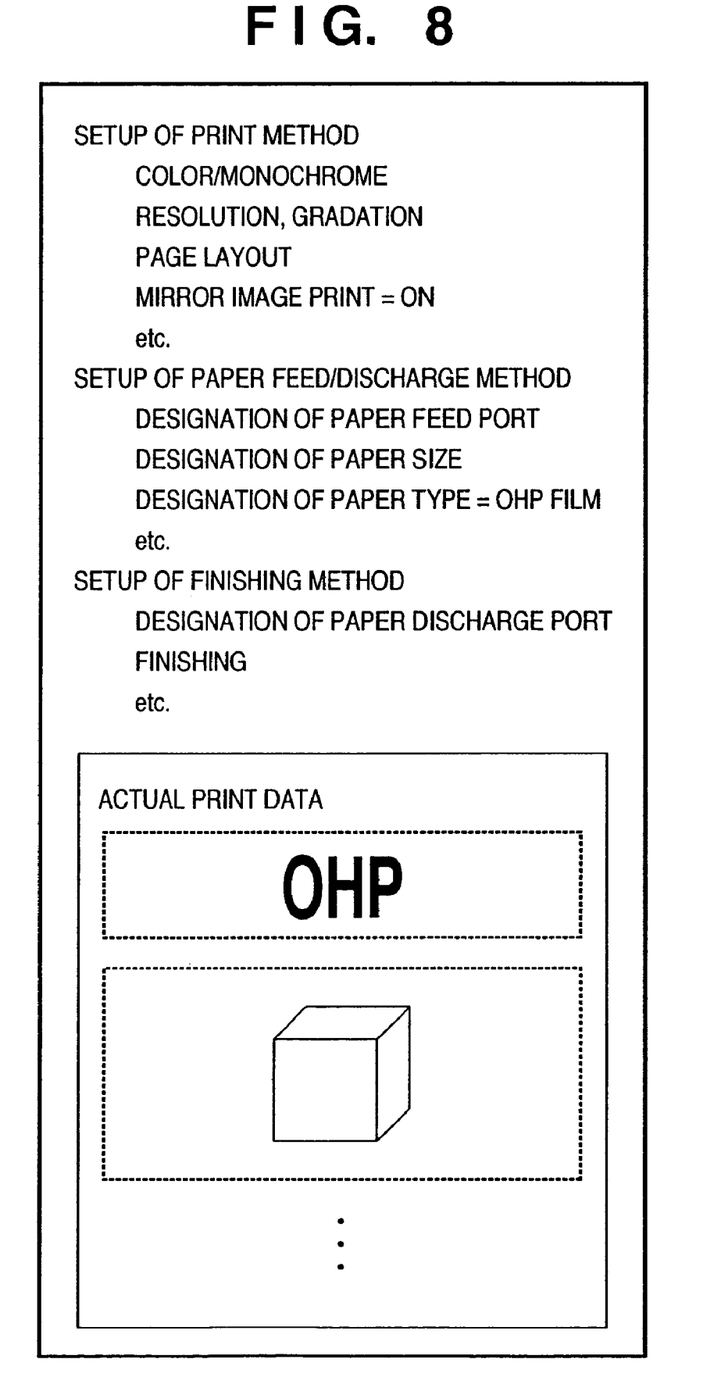
FIG. 8 shows an outline of the data configuration of a print job generated by a printer driver in the present invention.

In the subsequent processes, the printer driver 203 generates print data (conversion into PDL data) in the same manner as in a normal print mode irrespective of the medium setup (S704). Finally, the printer driver 203 appends the mirror image designation command and the command that designates OHP to the generated print data, and outputs that data as a print job (S705). The output print job is transferred to the printer 150 via the spooler 204. FIG. 8 shows an example of the data structure of this print job.

Referring to FIG. 8, the print job contains setup commands such as "setup of print method", "setup of paper feed/discharge method", "setup of finishing method", and the like. Of course, the print job may contain other setups. If OHP is designated as the type of medium, some setup items in "setup of print method" and "setup of paper feed/discharge method" are determined. That is, in "setup of print method", a "mirror image print" setup is ON. Also, in "setup of paper feed/discharge method", "designation of paper type" is "OHP film".

Upon receiving this data, the printer 150 operates, as shown in FIG. 7B. The setup commands are interpreted (step S706), and it is checked if the mirror image print designation command is set (step S707). If the mirror image print designation command is found, the coordinate system is converted to generate a mirror image in the same manner as in step S407 in FIG. 4B (step S708), and print data is rasterized on the memory 152 (step S709), thus forming one print image.

It is also checked if an OHP film is set as a medium (step S710). If an OHP film is set, the print engine setups are changed in correspondence with the OHP film (step S711). That is, a paper feed tray that stores OHP films is selected to feed an OHP film as a medium. If no OHP films are found at that time, a paper exchange request is issued to the user. Furthermore, the engine speed is switched to assure fixability suited to an OHP film.

Finally, the print image rasterized on the memory 152 is printed on the selected print medium (step S712), thus ending the print process. At this time if an OHP film is selected as a medium, since image data rasterized on the memory 152 is a mirror image, the OHP film, on the print surface of which the mirror image is printed, is obtained. This means that an image is printed on the reverse surface of the medium so that an original image can be visually recognized via the medium.

Figure 9:
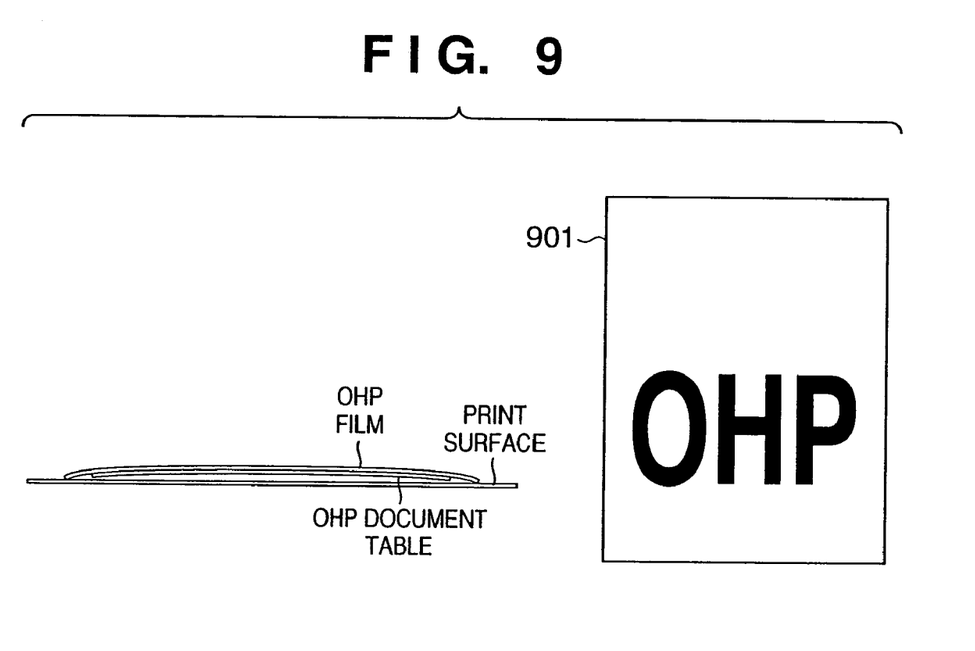
FIG. 9 shows a placing method and a projected image at that time when this embodiment is applied.

FIG. 9 shows an example when the OHP film obtained in this way is placed on the OHP document table. In order to prevent any blur due to curl of the film, the OHP film is placed on the document table with its print surface facing down. At this time, since the printed image has undergone the mirror image flip process, a projected image has a direction to be normally projected. Since the curl direction agrees with the down direction, a shaper image than the image 301 printed using the normal print mode can be obtained.

In the above description, the mirror image flip print mode is determined under the condition that an OHP sheet is selected as the type of print medium. In addition to this designation, the user may designate whether or not a mirror image print process is to be executed. In such case, when an OHP sheet is selected as the type of print medium on a print setup user interface window provided by the printer driver 203, a check box that allows the user to designate whether or not the mirror image print process is to be executed is enabled, as in the first embodiment. The user designates using this check box whether or not the mirror image print process is to be executed. In order to improve user's operability, such method of prompting the user to designate whether or not the mirror image print process is to be executed, when an OHP sheet is selected as the type of print medium, is adopted more preferably.

With the above method, in this embodiment, when a print process on an OHP film is designated, the mirror image print process is executed to allow the user to place the OHP film to have its curl direction opposite to that in the conventional method, thus obtaining a sharper projected image. Since these processes are automatically done when the medium to be printed is an OHP film, a higher-quality output can be provided without troubling the user.

Another Embodiment

In the aforementioned embodiments, setup mismatches may occur in association with the binding margin direction, print order, use of middle insert sheets, and the like. To avoid such mismatches, another switch is provided on the driver user interface in addition to the second embodiment, and the user can select using this switch whether or not the aforementioned automatic process (i.e., a process for executing a mirror image print process when an OHP film is designated as a medium) is to be executed.

Figure 10:
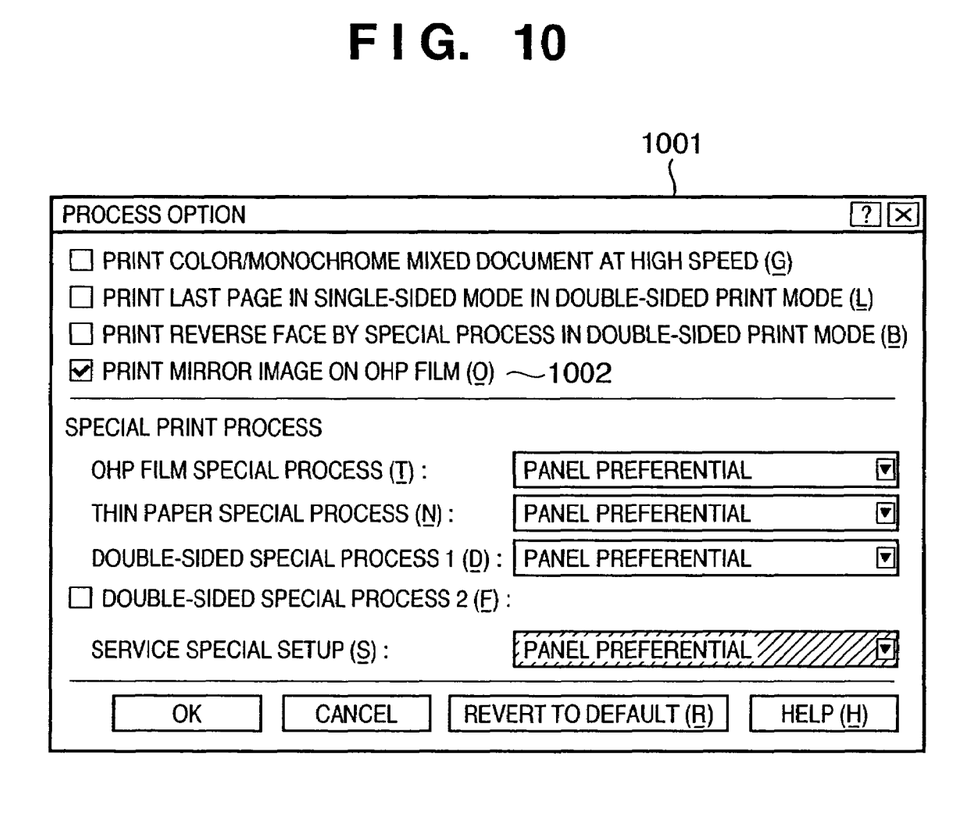
FIG. 10 shows a user interface that makes the user designate the process of the present invention.

FIG. 10 shows an example of a user interface. When the user checks a check box 1002 provided on a user interface 1001 before the print process, he or she can use the automatic mirror image print process on an OHP film, which has been explained in the above embodiment. In this case, when the check box 1002 is set, its setup is saved on the memory or HD. In FIG. 7B, it is determined immediately before step S701 if the check box 1002 is checked. If the check box 1002 is checked, the flow advances to step S701; otherwise, the flow jumps to step S704 after step S702 is executed. In this way, the user can selectively use a conventional print process on an OHP film and a mirror image print process.

In the above embodiments, an OHP film has been exemplified. Also, the present invention can be applied to a case wherein a transparent document to be placed on a document table is generated using a printer. That is, when such transparent document is placed on a document table and an image on that document is observed via the medium itself without being projected, if an image is formed on the film reverse surface according to the present invention, the film can be placed on the document table nearly flatly by its self weight, thus improving visibility.

Furthermore, even when the printer has no mirror image flip function, the host computer may execute a mirror image flip process upon generating PDL data. This process can be realized by executing the rasterize coordinate system conversion process of step S708 in step S703 of generating a mirror image print designation command in the second embodiment. For example, if an image is vector data, the sign of X-coordinate values is inverted, and a constant that can set the coordinate value of the coordinate origin to zero after conversion is added. On the other hand, if an image is bitmap data, all lines are horizontally flipped (or their address positions are reversed). When the host computer generates a mirror image in this way, the printer need not have any mirror image print function.

The printer driver 203 is prepared in correspondence with a plurality of types of printers in recent years. Hence, the printer 203 acquires device information of a printer and determines if a printer as an output destination has a mirror image flip print function. If the printer has the mirror image flip print function, the printer driver inserts a mirror image print designation command in the PDL data, as described in the above embodiments. When the printer driver outputs print data to a printer which has no mirror image flip print function, the rasterize coordinate system of the contents to be rendered may be changed to convert the contents to those of a mirror image, and PDL data to be output to the printer may be generated based on the converted contents.

The type of printer that can be used in the above embodiments is not particularly limited. For example, the present invention can be applied to a laser beam printer, ink-jet printer, thermal transfer printer, and the like as long as these printers can print on an OHP film.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, a phenomenon that makes an image unsharp due to curl formed upon printing an OHP film can be improved using a mirror image print process. Since this process is automatically executed when an OHP film is selected as a medium, a printout optimal to the user can always be provided.

Since an image is observed from the reverse surface side via a transparent medium, the transparent medium can be placed with its print surface facing down, and a warp of the transparent medium can be prevented.

When a print medium is a transparent medium, since an image is formed as a mirror image, and it is observed from the reverse surface side via the transparent medium, the transparent medium can be placed with its print surface facing down, and a warp of the transparent medium can be prevented.

Even when a transparent medium is designated, an image may be formed on the medium as it is.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus in which a printer driver is installed for transmitting a print job to be printed to a printer, comprising:

means for displaying a printer setting window activated by the printer driver;

print medium designating means for designating a print medium from the printer setting window;

mirror image print designating means for designating a mirror image print via the printer setting window on which it can be designated whether the mirror image print is performed or not when a transparent medium has been designated by said print medium designation means; and print job command setting means for setting a paper type designation command corresponding to a designation by said print medium designation means or a mirror image print command corresponding to a designation by said mirror image designation means in a PDL command of a print job to be generated by the information processing apparatus, wherein said print job command setting means (i) sets a transparent medium designation command in the PDL command of the print job when a transparent medium is designated by said print medium designation means and the mirror image print is not selected by said mirror image designation means, and (ii) sets the transparent medium designation command and the mirror image print designation command in the PDL command of the print job when a transparent medium is designated by said print medium designation means and the mirror image print is selected by said mirror image designation means, and wherein said information processing apparatus transmits a print job containing the PDL command set by said job command setting means to the printer.

2. An apparatus according to claim 1, wherein the print job that contains the PDL command set by said print job command setting means makes the printer perform printing corresponding to the print medium type designation command or the mirror image print designation command of the PDL command.

3. An information processing method performed by an information processing apparatus in which a printer driver is installed for transmitting a print job to be printed to a printer, said method comprising:

a step of displaying a printer setting window activated by the printer driver;

a print medium designating step of designating a print medium from the printer setting window;

a mirror image print designating step of designating a mirror image print via the printer setting window on which it can be designated whether the mirror image print is performed or not when a transparent medium has been designated in said print medium designation step; and a print job command setting step of setting a paper type designation command corresponding to a designation designated in said print medium designation step or a mirror image print command corresponding to a designation designated in said mirror image designation step in a PDL command of a print job to be generated by the information processing apparatus, wherein said job command setting step (i) sets a transparent medium designation command in the PDL command of the print job when a transparent medium is designated in said print medium designation step and the mirror image print is not selected in said mirror image designation step, and (ii) sets the transparent medium designation command and the mirror image print designation command in the PDL command of the print job when a transparent medium is designated in said print medium designation step and the mirror image print is selected in said mirror image designation step, and wherein said information processing apparatus transmits a print job containing the PDL command set by said job command setting means to the printer.

4. A method according to claim 3, wherein the print job that contains the PDL command set in said print job command setting step makes the printer perform printing corresponding to the print medium type designation command or the mirror image print designation command of the PDL command.

5. A computer readable storage medium on which a computer program for causing a computer to perform a method is embodied, said method is performed by an information processing apparatus in which a printer driver is installed for transmitting a print job to be printed to a printer, said method comprising:

a step of displaying a printer setting window activated by the printer driver;

a print medium designating step of designating a print medium from the printer setting window;

a mirror image print designating step of designating a mirror image print via the printer setting window on which it can be designated whether the mirror image print is performed or not when a transparent medium has been designated in said print medium designation step; and a print job command setting step of setting a paper type designation command corresponding to a designation designated in said print medium designation step or a mirror image print command corresponding to a designation designated in said mirror image designation step in a PDL command of a print job to be generated by the information processing apparatus, wherein said job command setting step (i) sets a transparent medium designation command in the PDL command of the print job when a transparent medium is designated in said print medium designation step and the mirror image print is not selected in said mirror image designation step, and (ii) sets the transparent medium designation command and the mirror image print designation command in the PDL command of the print job when a transparent medium is designated in said print medium designation step and the mirror image print is selected in said mirror image designation step, and wherein said information processing apparatus transmits a print job containing the PDL command set by said job command setting means to the printer.

6. A medium according to claim 5, wherein the print job that contains the PDL command set in said print job command setting step makes the printer perform printing corresponding to the print medium type designation command or the mirror image print designation command of the PDL command.

* * * * *

UNITED STATES PATENT AND TRADEMARK OFFICE
CERTIFICATE OF CORRECTION

| | |
|---|---|
| PATENT NO. | : 7,310,166 B2 |
| APPLICATION NO. | : 10/626531 |
| DATED | : December 18, 2007 |
| INVENTOR(S) | : Kouichi Sugiyama et al. |

It is certified that error appears in the above-identified patent and that said Letters Patent is hereby corrected as shown below:

COLUMN 9:

Line 54, "equipment" should read --piece of equipment.--.

Signed and Sealed this

Twenty-eighth Day of October, 2008

JON W. DUDAS
*Director of the United States Patent and Trademark Office*